March 5, 1946. D. J. EVANS 2,396,043
DISPENSING APPARATUS
Filed Feb. 15, 1943 3 Sheets-Sheet 1

Inventor
DAVID JOHNSON EVANS

March 5, 1946.　　　D. J. EVANS　　　2,396,043

DISPENSING APPARATUS

Filed Feb. 15, 1943　　　3 Sheets-Sheet 2

Inventor
DAVID JOHNSON EVANS

March 5, 1946. D. J. EVANS 2,396,043
DISPENSING APPARATUS
Filed Feb. 15, 1943 3 Sheets-Sheet 3
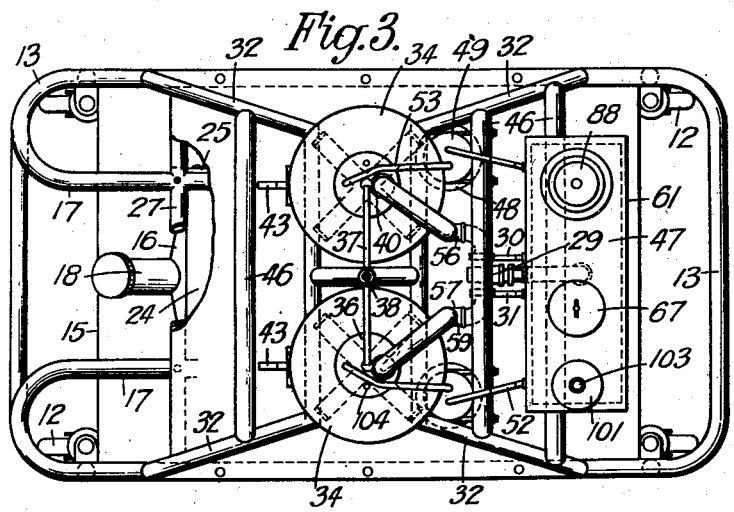
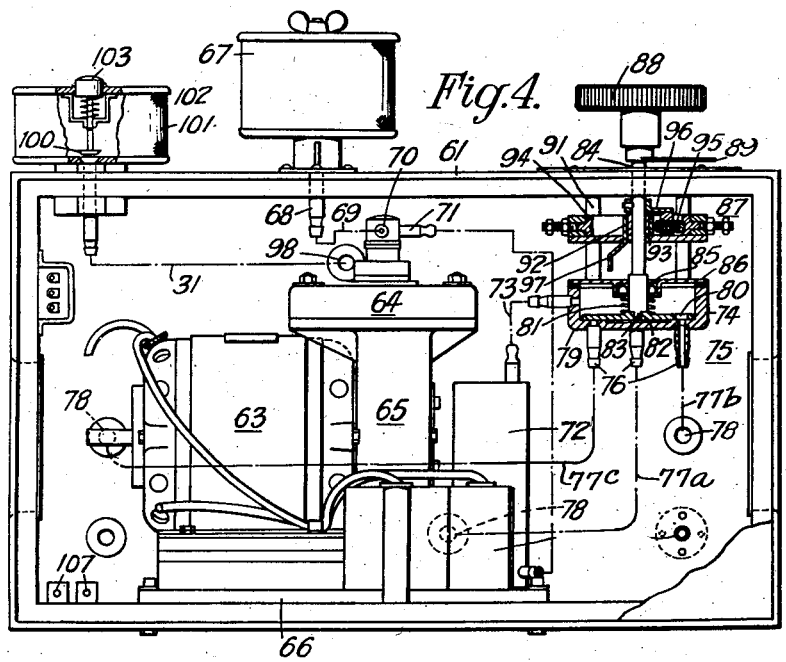
Inventor
DAVID JOHNSON EVANS Patented Mar. 5, 1946

2,396,043

UNITED STATES PATENT OFFICE 2,396,043

DISPENSING APPARATUS

David Johnson Evans, London, England, assignor to E. C. D. Limited, Tonbridge, England, a British joint-stock company Application February 15, 1943, Serial No. 475,989
In Great Britain March 23, 1942

6 Claims. (Cl. 128—230)

This invention relates to apparatus for dispensing liquid, such as a sterilising solution for the irrigation of burns or wounds, as in the new Bunyan treatment.

The invention has for its main object to provide improved apparatus for the preparation and supply of liquid, e. g., at a desired temperature and composition. Such apparatus is designed more especially for use in hospitals, for the dispensation of sodium hypochlorite.

The invention has for another object to provide an improved dispensing apparatus in which the separate liquids which are to be mixed, are delivered by pneumatic means to the mixing vessel or collector, the air being supplied by a pumping unit brought automatically into operation.

A further object is to ensure that the solution prepared and dispensed by the apparatus is maintained sterile, the air employed for forcing the liquids being sterilized by an attachment to the pumping unit.

Other objects will hereinafter appear.

The invention is hereinafter described with reference to the accompanying drawings, in which—

Fig. 4 is a front elevation of the control box, on a larger scale, showing the air pump unit and connections therein.

Fig. 5 is a diagram of the electrical connections.

Figure 1:
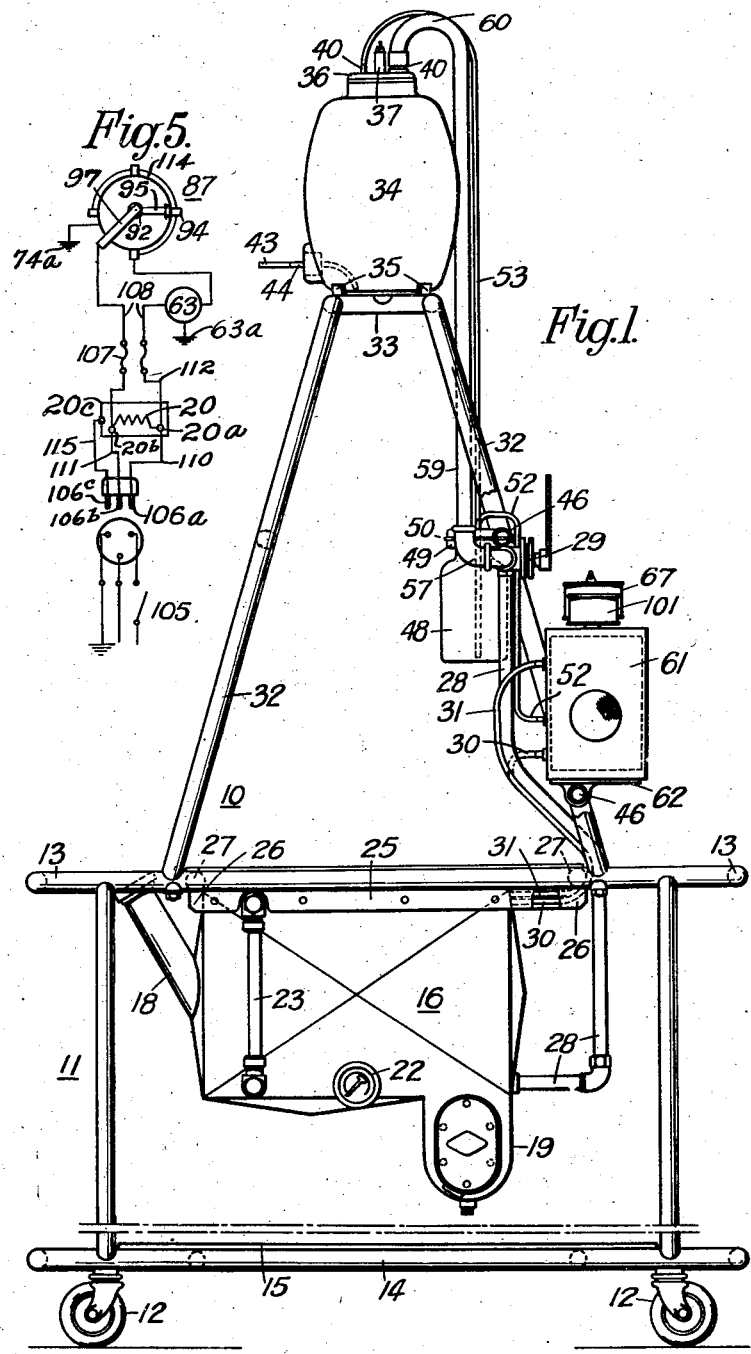
Fig. 1 is a side elevation of a dispensing apparatus having duplicate containers for the mixed liquid or solution, so that one quantity can be dispensed while a second quantity is being prepared.
Figures 2, 2A:
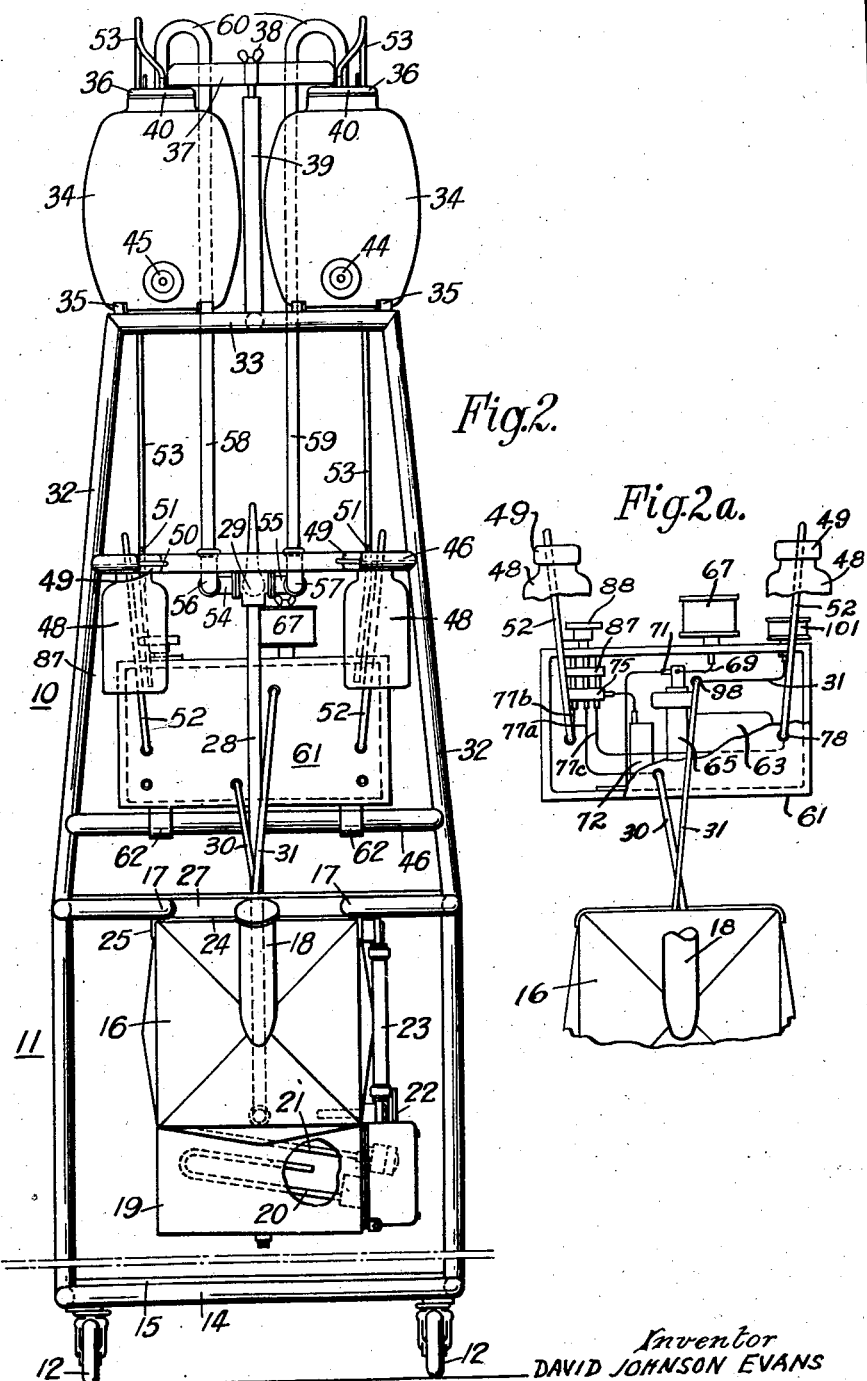
Fig. 2 is a rear elevation and Fig. 3 a plan view of the apparatus.
Fig. 2a is a modified detail of Fig. 2, illustrating certain of the connections to and from the containers.

According to the construction shown in Figs. 1 to 3, the apparatus includes a framework 10 built up of steel tubes welded or brazed together; the lower part of the framework forms a trolley 11 about 3 feet 6 inches in length, 2 feet in width and 2 feet 6 inches in height, the base being supported upon castor wheels 12 and the top tubes 13 of the trolley forming hand rails for propulsion. The bottom tubes 14 are spanned by a base board or shelf 15, for supporting buckets or other articles, above which there hangs a rectangular water-tank 16 of about ten gallons capacity suspended from parallel inturned extensions 17 of the side tubes 13 at the top of the trolley; a filling spout 18 at one end of the tank projects into the gap between the supporting tube-extensions 17, being shielded within the contour of the trolley. The water-tank has a heating compartment formed by a well or sump 19 enclosing an electric immersion heater 20, controlled by a thermostat 21 readily adjustable from the side of the trolley; a water thermometer 22 of the rotary pointer type and a gauge glass 23 are also arranged to be visible from this side. The tank is closed by an air-tight lid or cover plate 24 having side flanges 25 and end extensions 26 by which it is bolted to cross-tubes 27 running between the side tubes 13 and extensions 17. From the bottom of the tank, a delivery pipe 28 extends upwardly to a two-way cock 29, the water being forced out by means of compressed air admitted through a pipe 30 to the top of the tank; a vent-pipe 31 for releasing the air-pressure is also provided, this pipe being preferably controlled by means of a push-button valve, as hereinafter described.

Four inclined tubes 32 project above the trolley 11 to a height of about 5 feet 6 inches from the ground, these tubes connecting with a top platform 33 upon which a pair of glass jars 34 can be mounted in centering guides 35; the jars, which form containers for the mixture or solution to be dispensed, may have a capacity of one or two gallons apiece. The jars are provided with tight-fitting ebonite lids 36 engaged by the opposite extremities of a clamping beam 37 held down centrally by a wing nut 38 screwed upon the top end of a vertical post 39 in the middle of the platform, the pressure of the clamping beam maintaining the jars firmly in place. The lids 36 are fitted with nipples 40 for the attachment of pipes for the supply of water and liquid respectively to the jars, from which the resulting mixture or solution can be drawn off by means of rubber tubes 43 attached to short siphon pipes 44 fitted in bungs or corks 45 near the bottom of the jars.

The inclined tubes 32 supporting the platform 33 above the trolley are cross-connected at convenient levels by horizontal tubes 46, two of these tubes being utilized to support respectively an air-pump unit 47 and a pair of glass bottles 48 which form collectors or containers for the concentrated solution. The bottles have tight-fitting screw connections to ebonite caps 49 which are clamped to the supporting cross-tube 46 by means of U-shaped bolts 50 engaging circumferential grooves in the caps and passing through diametrical holes in the tube; the caps are each fitted with two nipples 51 for the attachment of pipes 52 and 53 serving respectively for the supply of compressed air to and for the delivery of liquid from the bottles 48, the pipes 53 extending inside the bottles to near the bottom in order to allow the air pressure to empty the bottles if necessary. The same cross-tube 46 also carries the two-way cock 29 connected to the delivery pipe 28 from the water-tank, this cock having two horizontal branches 54 and 55 connected by elbows 56 and 57 to two vertical supply pipes 58 and 59 extending up to above the jars 34 mounted on the top platform, the upper ends of these vertical pipes being turned over at 60 and connected to nipples 40 on the lids 36 of the respective jars.

A lower cross-tube 46 at the same end of the framework supports a control box 61 bolted upon lugs or brackets 62 brazed or welded to the tube; the box has a number of apertures for electrical and air connections, as hereinafter described, these apertures being preferably sealed with a suitable compound to avoid danger of flash or explosion in an atmosphere laden with ether or like vapours.

As seen in Fig. 4, where the front panel of the box is shown partly removed to reveal the interior, the control box encloses an air-pump unit comparts being mounted upon a base-plate 66 bolted to the bottom of the box; a detachable air filtering for a suitable drive to the pump diaphragm, these parts being mounted upon a base-plate 66 bolted to the bottom of the box; a detachable air filtering and sterilizing attachment 67, filled with cotton wool or the like and adapted for heat-sterilization, is mounted on the top of the box in connection with a nipple 68 in the interior, from which a flexible tube 69 is attached to the pump inlet 70. The pump delivery 71 is shown connected to a receiver 72 which acts to cool the compressed air and to smooth out the pulsations caused by the diaphragm; from this receiver, another flexible tube 73 leads to the air-tight casing or stator 74 of a multiway distributor 75 having a plurality of branches 76 connected to tubes 77 passing out through apertures 78 in the back of the box. The three branches 76 visible in Fig. 4 are connected by tubes indicated at 77a, 77b and 77c respectively to the pipe 30 leading to the top of the water tank 16, to the pipe 52 attached to the cap of the bottle 48 on the right-hand side of the apparatus, and to the pipe 52 attached to the cap of the bottle 48 on the opposite side. The connections of these three branches 76 by the tubes 77a, 77b and 77c to the pipe 30 and to the two pipes 52 are illustrated in Fig. 2a. The distributor rotor consists of a circular disc 79 having an aperture 80 which can be set to register with any one of the branches 76, the others being normally sealed off by the disc under pressure of the air assisted by an axial spring 81; in the center of the disc 79 there is provided a transverse slot 82 which is engaged by a key or tongue 83 upon the end of a rotary spindle 84 passing through a stuffing box 85 in the distributor cover 86. The distributor is mounted beneath a rotary electric switch 87, the same spindle 84 operating both devices and being extended through the top of the control box where it carries a milled knob 88 and a pointer 89 to indicate its position; the stators of the switch and distributor are supported from the top of the box by four long screws passing through tubular distance pieces 91 above and below the electric switch. The latter comprises a contact bush 92 mounted upon an insulating boss 93 in the center of the stator, a plurality of insulated contact studs 94 spaced around the periphery of the stator, and a telescopic contact plunger 95 mounted radially in a rotor arm 96 fixed on the spindle; the central contact bush 92 has a tail-piece 97 extending through the bottom of the stator and connected to the electrical supply, while the spaced contact studs 94 are all connected to the electric motor 63, so as to complete the motor circuit in every one of the positions in which the distributor 75 unseals a branch 76 for delivery of compressed air.

The vent-pipe 31 from the water tank 16 is led through an aperture 98 in the control box to a push-button device on the top of the box, incorporating a valve 100 normally allowing escape of air by way of a silencer 101 filled with cotton wool and mounted around the valve; the valve stem 102 is fitted with an external button 103 which has to be kept depressed while water is being forced out of the tank 16, failing which the pressure will escape and delivery will cease. This safeguard is intended to prevent flooding of the apparatus, if left unattended, and to allow the release of air-pressure from the tank 16 as soon as a desired volume of water has been delivered therefrom.

In operation, when the water-tank has been filled and the water raised to a desired temperature by means of the immersion heater 20, and the two glass bottles 48 filled with concentrated solution have been screwed to their lids 49 upon the cross tube 46, the electric motor 63 is started by any convenient means, preferably by the closing of its circuit through one of the contact studs 94 in the act of positioning the distributor knob 88 so that the compressed air delivered by the pump 64 is directed through the appropriate branch 76 of the distributor 75 and along the connected tube 77a and pipe 30 to the water-tank 16. Then, provided the push button 103 is depressed, water will be forced through the delivery pipe 28 to the two-way cock 29, the latter being set in one or the other of its alternative positions to pass the water up the vertical supply pipe 58 or 59 to the selected jar 34 upon the top platform 33; for example, the right-hand jar may be selected for filling by setting the handle of the cock 29 towards that side of the apparatus. After a suitable volume of water has been passed into the jar 34, the push button 103 is released to vent the air silently from the tank, by way of the pipe 31 passing through the aperture 98 to the bottom of the silencer 101. Next the distributor 75 is turned by means of its knob 88 so that while the motor circuit is reclosed through another of the contact studs 94 the compressed air is now directed through one of the other branches 76 to one of the bottles 48; for example, in the position of the distributor rotor shown in Fig. 4, the air will pass through the aperture 80 to the right-hand branch 76 and the connected tube 77b to the right-hand bottle through the air pipe 52 attached thereto. Liquid is thereby forced up the pipe 53 connected to the bottle cap, this pipe being attached to a nipple 40 on the lid of the selected jar 34 on the same (right-hand) side of the apparatus, so that a desired volume of the concentrated solution can be added to the water in the jar. The remainder of the water required to complete the filling of the jar is then added by restoring the distributor 75 to its former position and depressing the button 103 until the jar is full; the proportions of water and solution for a mixture of any desired strength can conveniently be measured by means of graduations upon the sides of the jars 34 and bottles 48. The supply pipes 59 are preferably arranged to produce turbulence in the jar during the admission and mixing of the liquids, and a thermometer (not shown) may be inserted through the lid 36 in order to check the temperature of the mixture at the time of use.

After the required quantity of solution at the desired temperature and concentration has been prepared, it may be drawn off from the jar 34 by means of the rubber tube 43 attached to the siphon 44 which dips nearly to the bottom of the jar, air being admitted to the jar through a vent-hole 104 in the lid. The preparation of a further quantity of solution in the second jar 34, on the left-hand side of the apparatus, utilizing concentrated solution from the second bottle 48, on the same side of the apparatus, may proceed in a similar way while the first quantity stands ready for use, the two-way cock 29 being set with its handle towards the left in order to pass the water to said second jar through the pipe 59 and the distributor being turned to pass air through the left-hand branch 76 and the connected tube 77c so as to force liquid from said second bottle.

As illustrated in Fig. 5, the electric immersion heater 20 of the water-tank may be connected in parallel with the electric motor 63, current being supplied from a common external source through a switch 105 and a plug-connector 106; fuses 107 are inserted in the leads 108 to the motor and rotary switch 87, these fuses being conveniently located on the base of the control box 61, as shown in Fig. 4. The electric motor 63 may be of any suitable design, for example, a single-phase motor of the "capacitor" type, the starting condenser being shown at 109 (Fig. 4) as mounted upon the base 66 which also supports the motor 63 and air pump 64.

The circuit for the water-tank heater 20 may be traced from the right-hand pin 106a of the plug-in jack by lead 110 to binding post 20a, through the heater 20 and back from post 20b by lead 111 to the second pin 106b of the jack. The parallel circuit for the motor 63 is branched off the heater circuit and may be traced from binding post 20a, by lead 112, fuse 107, lead 108 to the motor 63, through the motor windings (not shown), and back by lead 113 to the distributor contact studs 94, all connected together by lead 114, from a stud 94 selected by the momentary position of the distributor rotor to the contact plunger 95, bush 92 and tail-piece 97, by return lead 108 and fuse 107 to binding post 20b. It will be noted that the motor circuit is wired on a two-conductor system, whereas the source of supply is a three-conductor system with one conductor grounded; the motor frame and the distributor casing or stator are therefore shown with ground connections at 63a and 74a respectively, in accordance with the customary safety regulations. The heater circuit may likewise be wired on a two-conductor system, with ground-connections for the heater casing and plug-' jack, but as shown the third jack-pin 106c, which connects with the grounded pole of the supply system, is connected by a conductor 115 with the heater casing 20c, which is thereby grounded whenever the jack is inserted in its socket. Switch 105 is shown as single-pole type, controlling the "positive" pole of supply, but it might obviously be of two-pole type controlling both positive and negative poles.

What I claim is:

1. Dispensing apparatus, including a plurality of containers for liquids to be mixed, a collector adapted to hold said liquids when mixed, an air-pump, means for driving said air-pump, a distributor for directing compressed air from said air pump selectively to said containers one at a time for expelling liquid therefrom, and pipe connections for conveying the expelled liquid from each of said containers to said collector.

2. Dispensing apparatus, comprising a plurality of containers for liquids to be mixed, another container for the mixture of said liquids, an air-pump, means for driving said air-pump, means for directing compressed air from said air-pump selectively to said first-mentioned containers one at a time for expelling liquid therefrom, pipe-connections for conveying the expelled liquid to said other container, means for discharging the mixture from said other container, and a framework supporting said containers, air-pump, driving means, directing means, pipe-connections and discharging means.

3. Dispensing apparatus, comprising a plurality of containers for liquids to be mixed, another container for the mixture of said liquids, an air-pump, means for driving said air-pump, means for directing compressed air from said air-pump selectively to said first-mentioned containers one at a time for expelling liquid therefrom, manually controlled means for venting compressed air from one of said first-mentioned containers to stop the expulsion of liquid therefrom, pipe-connections for conveying the expelled liquid to said other container, and a pipe-connection for discharge of mixture from said other container.

4. Dispensing apparatus, comprising a plurality of containers for liquids to be mixed, another container for the mixture of said liquids, an air-pump, means for driving said air-pump, means for directing compressed air from said air-pump selectively to said first-mentioned containers one at a time for expelling liquid therefrom, a vent-pipe normally releasing compressed air from one of said first-mentioned containers, a valve adapted to close said vent-pipe, manual means for retaining said valve in closed position to maintain the expulsion of liquid from said one container, pipe-connections for conveying the expelled liquid to said other container, and a pipe-connection for discharge of mixture from said other container.

5. Dispensing apparatus, comprising a plurality of containers for liquids to be mixed, a collector for the mixture of said liquids, an air-pump, means for operating said air-pump, means for directing compressed air from said air-pump selectively to said first-mentioned containers one at a time for expelling liquid therefrom, pipe-connections for conveying the expelled liquid to said collector, means for discharging the mixture by gravity from said collector, and a framework supporting said containers, air-pump, pump-operating-means, directing means, pipe-connections and discharging means, said first-mentioned containers for liquids to be mixed being supported at lower levels on said framework than said collector, and the expulsion of liquids from said first-mentioned containers by compressed air from said air-pump lifting said liquid to the level of said collector for gravity discharge therefrom.

6. Dispensing apparatus, comprising a framework, a plurality of containers for liquids to be mixed, another container for the mixture of said liquids, all of said containers being supported upon said framework with said first-mentioned containers at lower level than said other container, pneumatic means for forcing liquid from said first-mentioned containers one at a time to said other container, means for controlling the quantities of the respective liquids delivered to said other container, and means for directing the discharge by gravity of the mixture from said other container.

DAVID JOHNSON EVANS.